United States Patent [19]

Kubota

[11] Patent Number: 5,517,151
[45] Date of Patent: May 14, 1996

[54] INTENSITY CONTROLLING CIRCUIT HAVING FUSES AND EPROMS FOR LED-ARRAY HEAD

[75] Inventor: Shinichi Kubota, Minoo, Japan

[73] Assignee: Ricoh Company, Ltd., Tokyo, Japan

[21] Appl. No.: 248,671

[22] Filed: May 25, 1994

[51] Int. Cl.[6] .......................... H01L 31/00; H01H 37/76; H01J 40/14; G01D 9/42
[52] U.S. Cl. .......................... 327/514; 327/515; 327/525; 327/566; 327/108; 250/206; 250/553; 347/238; 347/253; 365/112; 365/114; 365/244
[58] Field of Search ....................... 327/514, 515, 327/560, 561, 562, 108, 187, 369, 525; 250/553, 206; 346/107 R, 154, 76 PH, 76 L; 358/296; 365/112, 115, 244

[56] References Cited

U.S. PATENT DOCUMENTS

| | | | |
|---|---|---|---|
| 4,706,130 | 11/1987 | Yamakawa | 358/296 |
| 4,746,941 | 5/1988 | Pham et al. | 346/154 |
| 5,166,702 | 11/1992 | Mattern et al. | 346/107 R |
| 5,253,934 | 10/1993 | Potucek et al. | 346/107 R |
| 5,264,868 | 11/1993 | Hadley et al. | 346/107 R |
| 5,309,151 | 5/1994 | Aoki | 346/107 R |

FOREIGN PATENT DOCUMENTS 63-240168  10/1988  Japan .

Primary Examiner—David C. Nelms
Assistant Examiner—Trong Phan
Attorney, Agent, or Firm—Woodcock Washburn Kurtz Mackiewicz & Norris

[57] ABSTRACT

An intensity controlling circuit device can correct variation in intensity of light beams, due to tolerance occurred in each of a plurality of LED-array chips, emitted by LEDs provided in each of the LED-array chips. The intensity controlling circuit device is connected to at least one LED-array chip comprising a plurality of LEDs and slave transistors corresponding to each of the LEDs. The intensity controlling circuit device comprises an intensity controlling circuit connected to the respective LED-array chip. The intensity controlling circuit comprises a first transistor provided between a power source and a constant current generating unit so as to supply a current to the LED-array chip, and an intensity adjusting unit having a second transistor connected to the first transistor in parallel and a controlling unit for controlling the on/off state of the second transistor. An output of the intensity controlling circuit is connected to each of the slave transistors provided in the LED-array chip, and the second transistor is turned on/off by the controlling unit so that a current flowing in each of the LEDs is adjusted to a predetermined value.

2 Claims, 7 Drawing Sheets

INTENSITY CONTROLLING CIRCUIT HAVING FUSES AND EPROMS FOR LED-ARRAY HEAD

BACKGROUND OF THE INVENTION

The present invention relates to an intensity controlling circuit device for an LED-array head used for printers or facsimile machines.

A light emitting diode (LED) is used for projecting a light beam so as to expose a photosensitive material of a printer drum provided in a printer. Intensity of the LED may be controlled using an intensity controlling circuit device 6 shown in FIG. 1. In the device 6 shown in FIG. 1, a few thousands to a few ten thousands of LEDs 1-1 to 1-n may be used. P-channel type MOS (PMOS) transistors 2-1 to 2-n, which are slave transistors, are connected to anodes of the respective LEDs 1-1 to 1-n. A gate of each transistor 2-1 to 2-n is connected to a power source 8 via respective PMOS transistors 7-1 to 7-n. The gate of each transistor 2-1 to 2-n is also connected to an output of the intensity controlling circuit device 6 via respective transmission gates 5-1 to 5-n. Outputs of AND circuits 9-1 to 9-n are connected to gates of the PMOS transistors 7-1 to 7-n and control terminals of the transmission gates 5-1 to 5-n. The AND circuits 9-1 to 9-n are connected to outputs of latch 4. The latch 4 latches binary image data, which is stored in a shift register 3, in synchronization with a shift clock signal supplied to the shift register 3. Each of the AND circuits 9-1 to 9-n supplies the binary image data to the respective LEDs 1-1 to 1-n according to an enable signal supplied to an input thereof.

In the above-mentioned circuit, data according to the binary image data latched by the latch 4 is output from the AND circuits 9-1 to 9-n while the enable signal supplied to the AND circuits 9-1 to 9-n is in a high level state. The slave transistors 2-1 to 2-n are selectively operated to supply an electric current I2 to the respective LEDs 1-1 to 1-n so that the selected LEDs 1-1 to 1-n emit light beams.

A construction of the intensity controlling circuit 6 is also shown in FIG. 1. The intensity controlling circuit device comprises a PMOS transistor 11, an N-channel type MOS (NMOS) transistor 12, a resistor 13 and an operational amplifier 14. A source of the PMOS transistor 11 is connected to the power source 8. A gate of the PMOS transistor 11 is connected to the PMOS transistors 2-1 to 2-n. A gate of the NMOS transistor 12 is connected to an output of the operational amplifier 14. A reference voltage (Vref) is applied at a positive terminal of the operational amplifier 14. A voltage applied to a point A in the figure is supplied to a negative terminal of the operational amplifier 14. A connecting point, indicated by B in the figure, between the PMOS transistor 11 and the NMOS transistor 12 is connected to the inputs of the transmission gates 5-1 to 5-n. The resistor 13 is connected between the NMOS transistor 12 and the ground. The NMOS transistor 12, the resistor 13 and the operational amplifier 14 together comprise a constant current generating means.

The operational amplifier 14 controls a voltage applied to the gate of the NMOS transistor 12 so that the voltage at the point A is equal to the reference voltage Vref. Since the point A is grounded via the resistor 13, a current I1 (=Vref÷resistance of the resistor 13) flows to the resistor 13. The current I1 flows into a drain of the NMOS transistor 12 via a drain of the PMOS transistor 11.

Since the PMOS transistor 11 and each of the PMOS transistors 2-1 to 2-n comprises a current mirror circuit, a gate voltage of the PMOS transistor 11 is applied to a gate of each of the PMOS transistors 2-1 to 2-n via the respective transmission gates 5-1 to 5-n. Accordingly, if each of the PMOS transistors 2-1 to 2-n has the same transistor size with the PMOS transistor 11, a current equal to the current I1 flowing in the PMOS transistor 11 flows to the PMOS transistors 2-1 to 2-n. Accordingly, a current flowing to each of the LEDs 1-1 to 1-n can be controlled by the current flowing in the PMOS transistor 11. It should be noted that the PMOS transistor 11 is referred to as a master transistor.

Additionally, Japanese Laid-Open Patent Application No. 63-240168 discloses, with reference to FIG. 3, a circuit for adjusting an intensity of a light beam emitted by each LED provided in an LED-array. In the LED-array, a plurality of LEDs are arranged along a line. This circuit is provided for adjusting the intensity of light beam emitted by each of the LEDs so as to correct variation in intensity of the light beam due to tolerance of each LED.

In the circuit shown in FIG. 3 of Japanese Laid-Open Patent Application No. 63-240168, an LED driving transistor and an AND circuit are needed for each of the LEDs. This construction causes an increase in size of the LED-array chip. Additionally, reliability of the LED-array chip is reduced due to an increase in the number of gates provided in the LED-array chip.

For example, a conventional LED-array head has 64 LEDs arranged in a 5 mm square chip (LED-array chip). In an LED-array head used for A1 size printer, approximately 300 LED-array chips are arranged along a line. The above-mentioned intensity controlling circuit 6 formed in the LED driving circuit chip is also provided to each of the LED-array chips. In the above-mentioned circuit construction of the LED-array head, all the transistors and AND circuits comprising together the LED driving circuit must be operated in a normal condition. Accordingly, an inspection time for the LED-array head may be increased, and possibility of defect of the transistors and AND circuits may be increased, and thus reliability of the LED-array chip is decreased.

However, since LEDs and LED driving circuits have recently been manufactured using a wafer manufacturing process, the tolerance in the LEDs in the LED-array and the LED driving circuits can be almost zero. Therefore, recently, there has been no need to adjust the intensity of the light beam emitted by each of the LEDs in the LED-array.

On the other hand, while the variation in the light beam emitted by the LEDs in a single LED-array is reduced, variation of the intensity of the light beams due to tolerance in the LED-array chips and the LED driving circuit chips still exists in the order of a few percent to a few tens percent. This variation in intensity of the light beams causes a deterioration in printing quality.

SUMMARY OF THE INVENTION

It is a general object of the present invention to provide an improved and useful intensity controlling circuit device for a light emitting device used in a printer in which intensity controlling circuit device the above-mentioned problems are eliminated.

A more specific object of the present invention is to provide an intensity controlling circuit device which can correct variation in intensity of light beams, due to tolerance incurred in each of a plurality of LED-array chips, emitted by LEDs provided in each of the LED-array chips.

In order to achieve the above-mentioned objects, there is provided according to the present invention, an intensity controlling circuit device used for an LED-array head having at least one LED-array chip comprising a plurality of LEDs and slave transistors corresponding to each of the LEDs, the intensity controlling circuit device comprising an intensity controlling circuit connected to the respective LED-array chip so as to control intensity of light beams emitted by the LEDs, the intensity controlling circuit comprising:

a first transistor provided between a power source and constant current generating means for generating a constant current flowing in the first transistor so as to supply a current to the LED-array chip; and intensity adjusting means having a second transistor connected to the first transistor in parallel and controlling means for controlling the on/off state of the second transistor, wherein an output of the intensity controlling circuit is connected to each of the slave transistors provided in the LED-array chip, and the second transistor is turned on/off by the controlling means so that a current flowing in each of the LEDs is adjusted to a predetermined value.

According to the present invention, since the first and second transistors and the slave transistors constitute a current mirror circuit, the current flowing in the LEDs in the LED-array chip can be controlled by each LED-array chip by turning on/off said second transistor. Therefore, variation in intensity of the light beams emitted by the LEDs in the LED-array chip can be corrected for each LED-array chip.

Other objects, features and advantages of the present invention will become more apparent from the following detailed description when read in conjunction with the accompanying drawings.

DETAILED DESCRIPTION OF THE PREFERRED EMBODIMENTS

Figure 2:
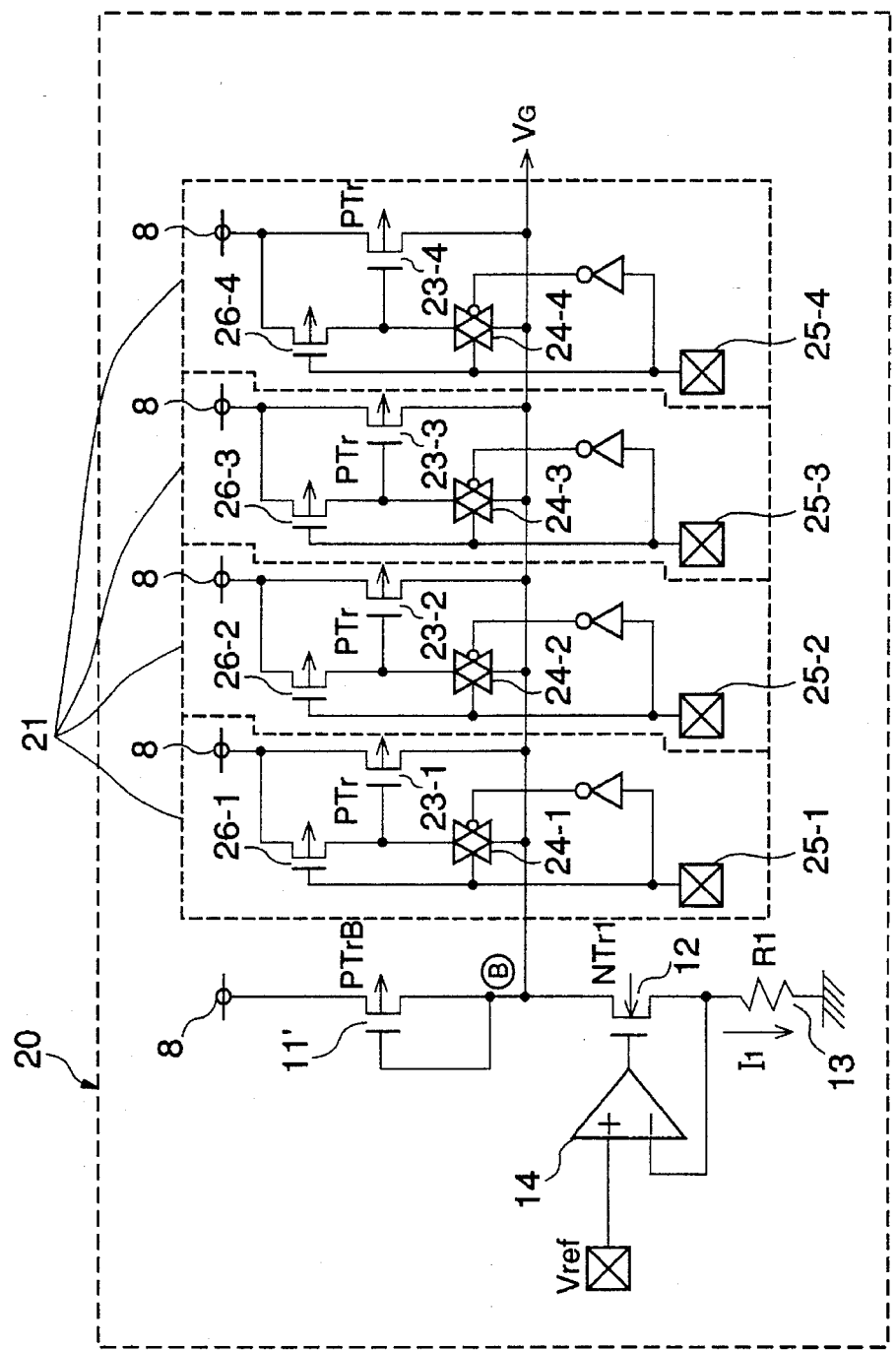
FIG. 2 is a circuit diagram of an embodiment of an intensity controlling circuit device according to the present invention.
Figure 3:
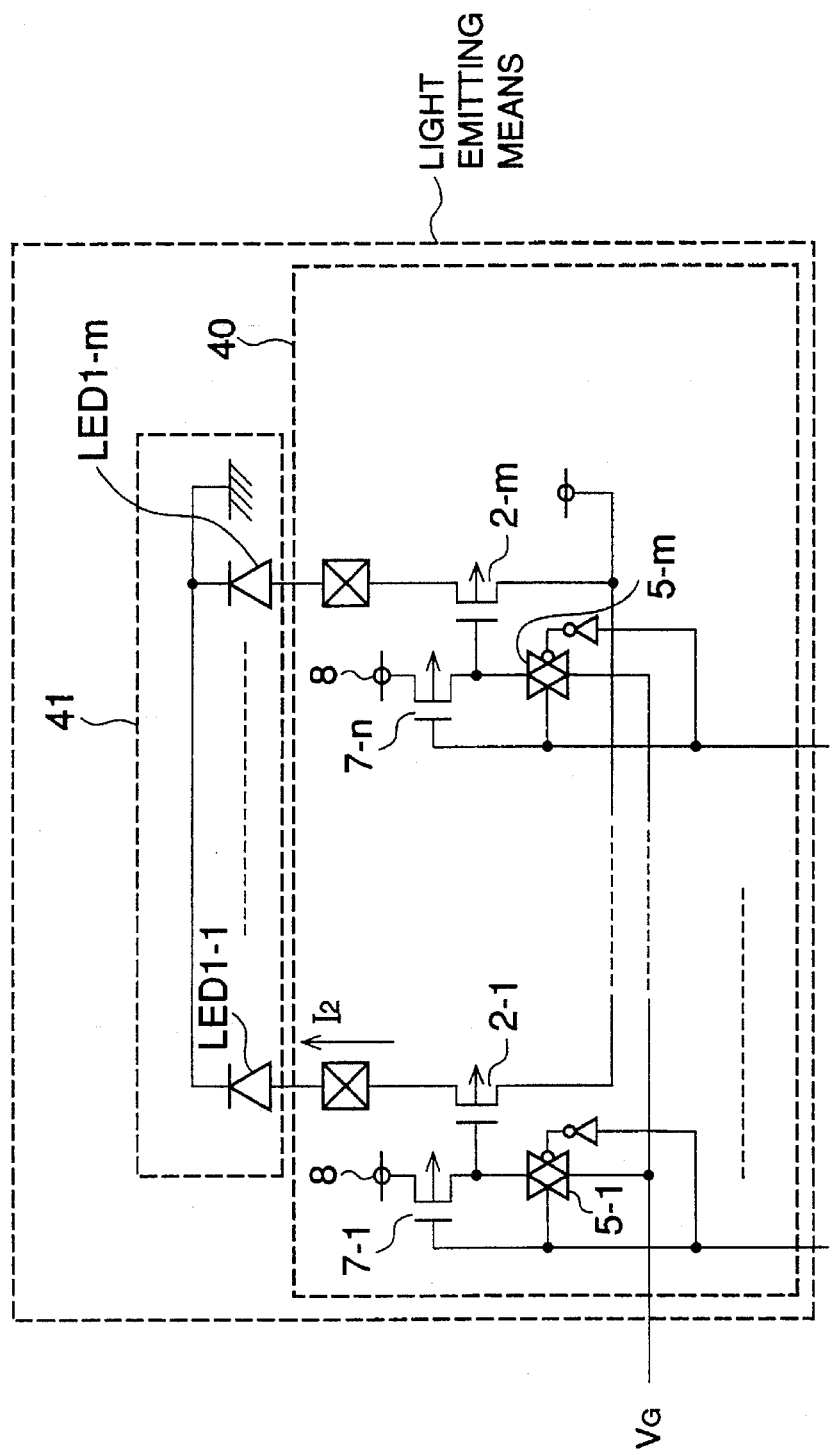
FIG. 3 is a circuit diagram of an LED driving circuit connected to the intensity controlling circuit shown in FIG. 2.
Figure 4:
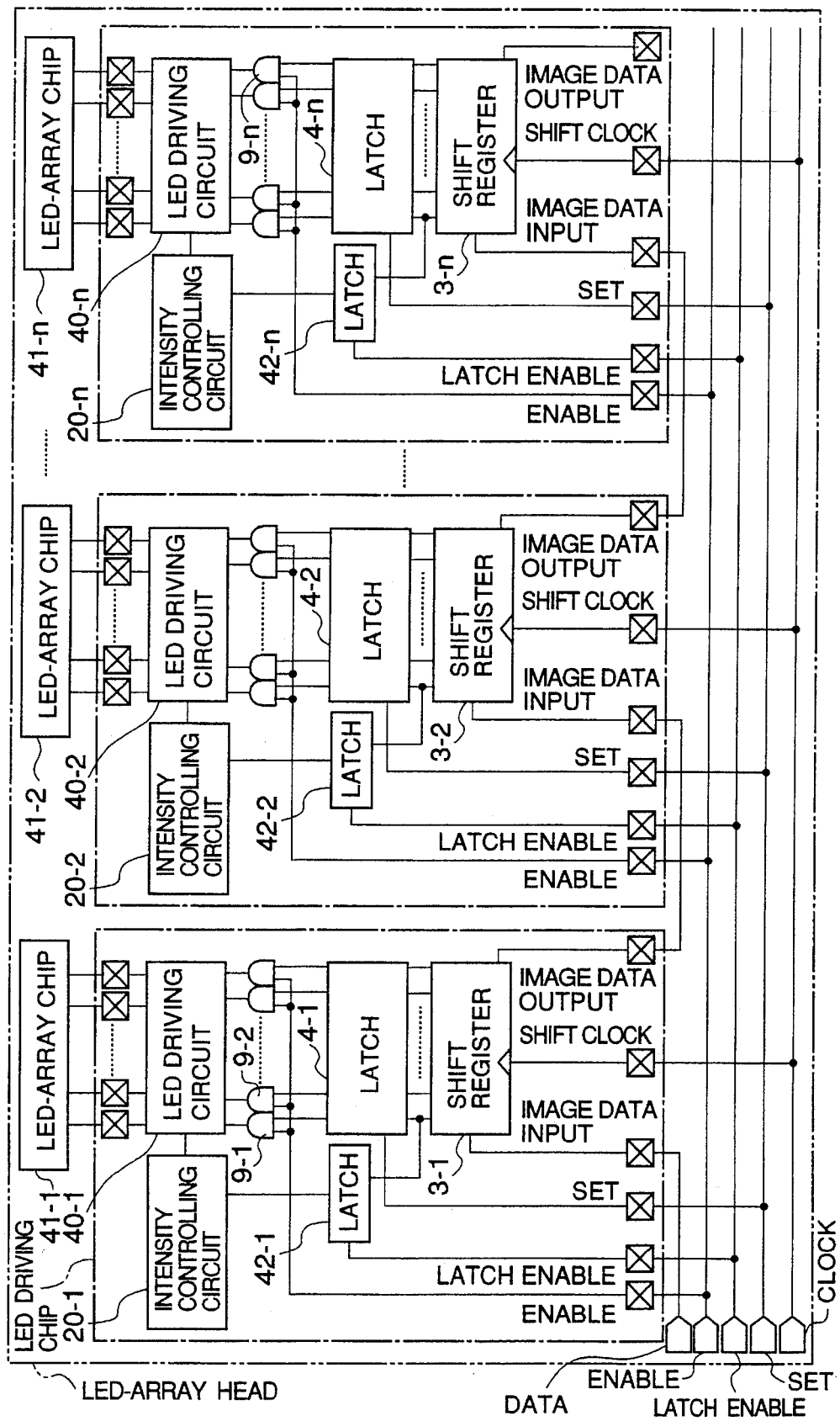
FIG. 4 is a block diagram of an LED-array head provided with the intensity controlling circuit device shown in FIG. 2.

A description will now be given, with reference to FIGS. 2 through 4, of an embodiment according to the present invention. In FIGS. 2 through FIG. 4, parts that are the same as the parts shown in FIG. 1 are given the same reference numerals, and descriptions thereof will be omitted.

Referring now to FIG. 4, which illustrates a circuit structure of an LED-array head having an embodiment of an intensity controlling circuit device according to the present invention, the intensity controlling circuits 20-1 to 20-n, are connected to the respective LED driving circuits 40-1 to 40-n included in light emitting means. Hereinafter, the intensity controlling circuits 20-1 to 20-n may be referred to as intensity controlling circuits 20 as a whole, and the LED driving circuits 40-1 to 40-n may be referred to as LED driving circuits 40 as a whole. Each of the LED driving circuits 40 is connected to the respective LED-array chips 41-1 to 41-n, each of which is comprised of a single chip. A plurality of LEDs are arranged in the LED-array chips 41-1 to 41-n. The LED-array chips 41-1 to 41-n may be referred to as LED-array chips 41 as a whole. The above-mentioned light emitting means comprises, as shown in FIG. 4, the LED driving circuits 40 and the corresponding LED-array chips 41.

Figure 1:
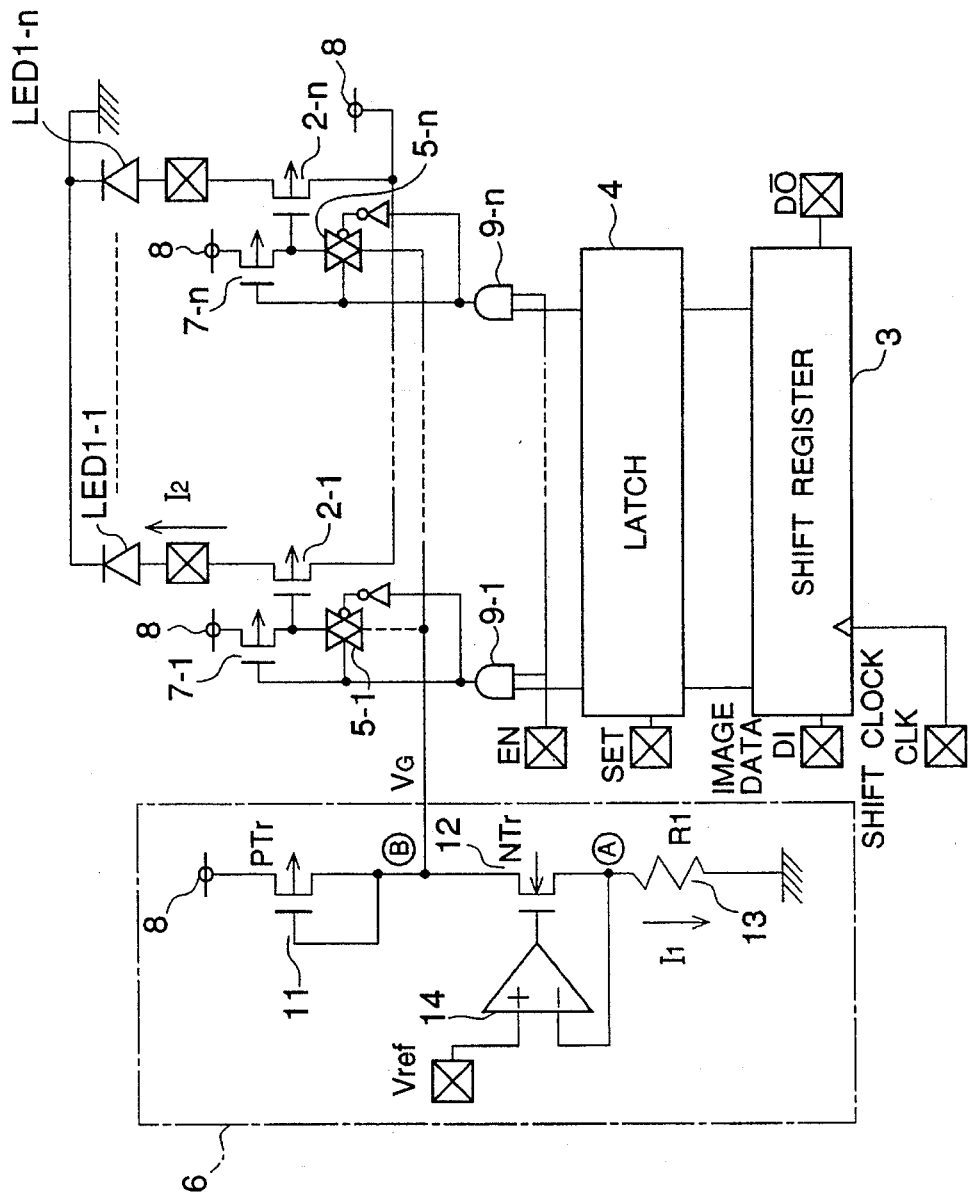
FIG. 1 is a circuit diagram of a conventional LED-array head including an intensity controlling circuit device.

Similarly to the conventional LED-array head shown in FIG. 1, AND circuits 9-1 to 9-n (may be referred to as AND circuits 9 as a whole) are connected to the respective LED driving circuits 40. Outputs of latches 4-1 to 4-n (may be referred to as latches 4 as a whole) are connected to inputs of the AND circuits 9. Outputs of the shift registers 3-1 to 3-n (may be referred to as shift registers 3 as a whole), which store image data supplied from an external device, are connected to the respective latches 4.

In the present embodiment, latches 42-1 to 42-n (may be referred to as latches 42 as a whole) are connected to outputs of the shift registers 3. The latches 42 latch the data stored in the shift registers 3 when a latch enable signal is supplied from an external device. Each output of the latches 42 is connected to the corresponding control signal input terminals 25-1 to 25-n provided in the intensity controlling circuits 20 shown in FIG. 2.

When the latches 42 latch data, data stored in the shift registers 3 is not the image data but the control signal data used for controlling intensity adjusting circuits 21 shown in FIG. 2. Accordingly, the latches 42 latch the control signal data.

A first embodiment of an intensity controlling circuit device according to the present invention shown in FIG. 2 comprises the intensity controlling circuits 20, the LED driving circuits 40, the LED-array chips 41, the latches 42 and the shift registers 3. It should be noted that, for example, the intensity controlling circuit 40-1, the LED-array chip 41-1, the latch 42-1 and the shift register 3-1 may be incorporated into one chip as an LED driving chip.

In the intensity controlling circuit 20 shown in FIG. 2, voltage indicated by "VG" corresponds to the voltage "VG" shown in FIG. 1. Additionally, the present embodiment has an operation amplifier 14 and the resistor 13 similarly to the conventional intensity controlling circuit 6 shown in FIG. 1.

As shown in FIG. 2, a connection point B between a PMOS transistor 11', which is a first transistor, and the NMOS transistor 12 is connected to an input of the LED driving circuit 40. Drains of PMOS transistors 23-1 to 23-4 and inputs of transmission gates 24-1 to 24-4 are also connected to a signal line extending from the connection point B to an input terminal of the LED driving circuit 40. The PMOS transistors 23-1 to 23-4, which are second transistors, act as intensity controlling transistors. The transmission gates 24-1 to 24-4 are turned on/off according to control signals supplied via control signal input terminals 25-1 to 25-4 so as to turn on/off the PMOS transistors 23-1 to 23-4.

Outputs of the transmission gates 24-1 to 24-4 are connected to drains of PMOS transistors 26-1 to 26-4 and drains and gates of the PMOS transistors 23-1 to 23-4. Sources of the PMOS transistors are connected to the power source 8. Gates of the PMOS transistors 26-1 to 26-4 are connected to the control signal input terminals 25-1 to 25-4. As mentioned above, in the present embodiment, the latches 42 are connected to the control signal input terminals 25-1 to 25-4 so that the intensity controlling circuits 20 are connected to the latches 42.

It should be noted that intensity controlling means for controlling on/off of the transistors 23-1 to 23-4 comprises the transmission gates 24-1 to 24-4, the control signal input terminals 25-1 to 25-4, the PMOS transistors 26-1 to 26-4 and inverters shown in FIG. 2. Additionally, as shown in FIG. 2, the intensity adjusting circuit 21 comprises the intensity controlling means, the power source 8 and the PMOS transistors 23-1 to 23-4.

The LED driving circuit 40 has a circuit construction similar to the circuit, shown in FIG. 1, including the LEDs 1, PMOS transistors 2, the transmission gates 5, PMOS transistors 7 and the power source 8. 64 LEDs are, for example, provided in each of the LED driving circuits 40.

In the above-mentioned embodiment of the intensity controlling circuit according to the present invention, PMOS transistor 11' and PMOS transistors 23-1 to 23-4 included in the intensity adjusting circuit 21 and the PMOS transistors 2 included in the LED driving circuits 40 comprise a current mirror circuit. Accordingly, in the case where those PMOS transistors have the same transistor size (described later), and when the PMOS transistors 23-1 to 23-4 are in the off state, a current flowing in the PMOS transistor 11' is equal to a current flowing in the PMOS transistors 2 included in each of the LED driving circuits 40.

Figure 5:
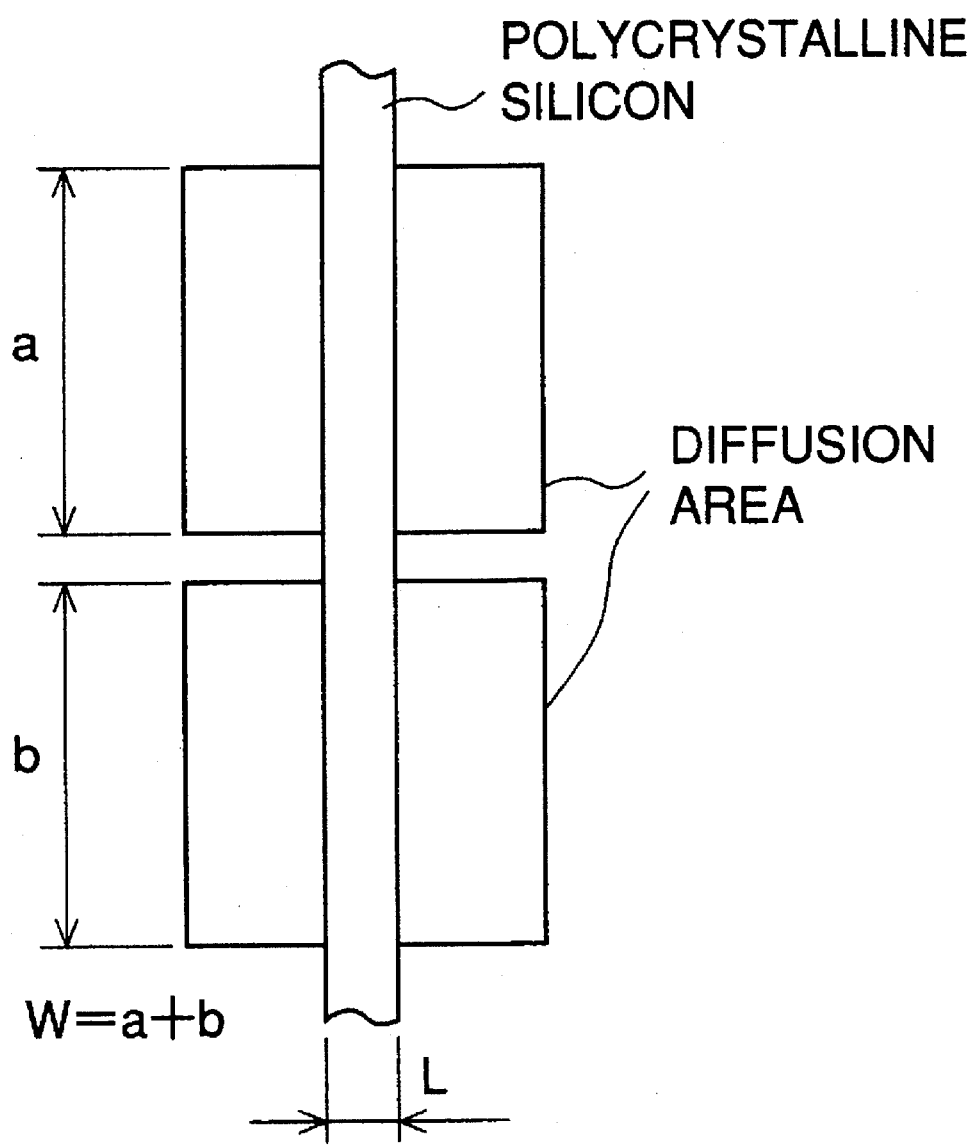
FIG. 5 is an illustration for explaining a transistor size.

It should be noted that, in the present invention, the transistor sizes of the PMOS transistor 11' and the PMOS transistors 23-1 to 23-4 are in the ratio of 5:1:1:1:1. Additionally, the transistor sizes of each of the PMOS transistors 2 and the PMOS transistor 11' are in the ratio of 5:5 (1:1). The transistor size refers to, as shown in FIG. 5 which is a plane view of a MOS transistor formed on an IC substrate, a width W of diffusion areas provided for forming a source and a drain of a transistor when a width L of a polycrystalline silicon on which gates of the MOS transistor are formed is constant. That is, as shown in FIG. 5, the width W is a sum of a width a and a with b of the diffusion areas.

Variation of the intensity of a light beam emitted by each of the LED-array chips 41 is measured after the LED-array head is manufactured. The current flowing to each of the LEDs 1 is determined for each of the LED-array chips 41 so that variation in intensity of the light beam emitted by each of the LED-array chips 41 is eliminated. The current value of the determined current may be stored in an EPROM provided, for example, in a printer into which the intensity controlling circuit device is incorporated. The stored current value may be supplied to the intensity controlling circuit device from the EPROM when an operation of the printer is started. Binary data obtained based on the current value is then stored in the respective shift resistors 3, and then supplied to the latches 42.

The binary data, which is a control signal, supplied to the latches 42 is then supplied to each of the control signal input terminals 25 provided in the intensity adjusting circuits 21 comprising the intensity controlling circuits 20. The PMOS transistors 26-1 to 26-4 and the transmission gates 24-1 to 24-4 are turned on/off according to the level of the binary data supplied to the control signal input terminals 25-1 to 25-4, and thereby the PMOS transistors 23-1 to 23-4 are turned on/off.

Considering the transistor size mentioned above, when all of the PMOS transistors 23-1 to 23-4 are turned off according to the binary signals supplied to the control signal input terminals 25-1 to 25-4, the current I2 flowing in each of the LEDs 1 is equal to the current I1 because the transistor size of the transistor 11' and each of the PMOS transistors 2 are equal to each other as mentioned above (I2=(5/5)×I1).

For example, when one of the PMOS transistors 23-1 to 23-4 is turned on and others are turned off, the current I2 flowing in the LEDs 1 is equal to (5/6)×I1 because the ratio of the transistor sizes of the PMOS transistor 11' to each of the PMOS transistors 23-1 to 23-4 is 5:1. The current I2 is calculated by the equation I2={5/(5+1)}×I1.

For example, when two of the PMOS transistors 23-1 to 23-4 are turned on and others are turned off, the current I2 flowing in the LEDs 1 is equal to (5/7)×I1 because the ratio of the transistor sizes of the PMOS transistor 11' to each of the PMOS transistors 23-1 to 23-4 is 5:1. The current I2 is calculated by the equation I2={5/(5+2)}×I1.

Similarly, when three of the PMOS transistors 23-1 to 23-4 are turned on and one is turned off, the current I2 flowing in the LEDs 1 is equal to (5/8)×I1. When all of the PMOS transistors 23-1 to 23-4 are turned on, the current I2 flowing in the LEDs 1 is equal to (5/9)×I1.

As mentioned above, by controlling the on/off state of the transistors 23-1 to 23-4 by the control signal supplied to the control signal input terminals 25 via the latches 42, all of the LEDs 1 provided in each of the LED driving circuits 40 can be controlled. That is, intensity of the light beams emitted by each of the LED-array chips 41 corresponding to the respective LED driving circuits 40 can be adjusted in accordance with the control signal supplied to the control signal input terminals 25-1 to 25-4.

The above-mentioned adjustment of the light beams emitted by each of the LED-array chips 41 can be realized by merely adding the intensity adjusting circuits 21 each of which has a simple circuit construction. Accordingly, size of the LED driving chips is not greatly increased, and thus the manufacturing cost of the LED-array head can be reduced. Additionally, inspection of the LED driving circuits 40 can be completed by only performing an inspection for one of the PMOS transistors 2-1 to 2-m because the same current always flows to each of the PMOS transistors 2-1 to 2-m in the same LED driving circuit. Accordingly, inspection time and cost for the LED-array head can be reduced. Further, since the number of gates connected to one LED in the LED-array chip is reduced as compared with the conventional apparatus, high reliability of the LED driving chip can be obtained.

In the above mentioned embodiment, the transistor sizes of the PMOS transistors 11' and 23-1 to 23-4 may instead be in the ratio of 20:1:2:4:8. In this case, the ratio of the transistor size of the PMOS transistor 11' to each of the PMOS transistors 2 is set to 20:20 (1:1). By using the above-mentioned transistor sizes, the current I2 flowing in the LEDs 1 can be set to sixteen levels, that are (20/20)×I1, (20/21)×I1, (20/22)×I1, (20/23)×I1, (20/24)×I1, . . . , (20/35)×I1.

Additionally, by changing the ratio of the transistor size of the PMOS transistor 11' to each of the PMOS transistors 2, the adjustment range of the current I2 can be wider or narrower. For example, when the ratio of the transistor size of the PMOS transistor 11' to each of the PMOS transistors 2 is set to 25:40, the above-mentioned current I2 can be changed from (40/40)×I1 to (40/25)×I1.

It should be noted that although four PMOS transistors 23-1 to 23-4 are provided in the above-mentioned embodiment, the number of PMOS transistors is not limited to the specific number and a less or greater number of PMOS transistors may be provided to decrease or increase the number of adjusting levels of the intensity of the light beams emitted by the LED-array chip. In such a case, the number of bits of the data to be supplied to the latches 42 must be changed to an appropriate value.

In the above-mentioned embodiment, although the control signal is supplied to the control signal input terminals 25 via the latches 42, the control signal may be supplied directly only to the control signal input terminals which are connected to the PMOS transistors 23-1 to 23-4 to be controlled.

Figure 6:
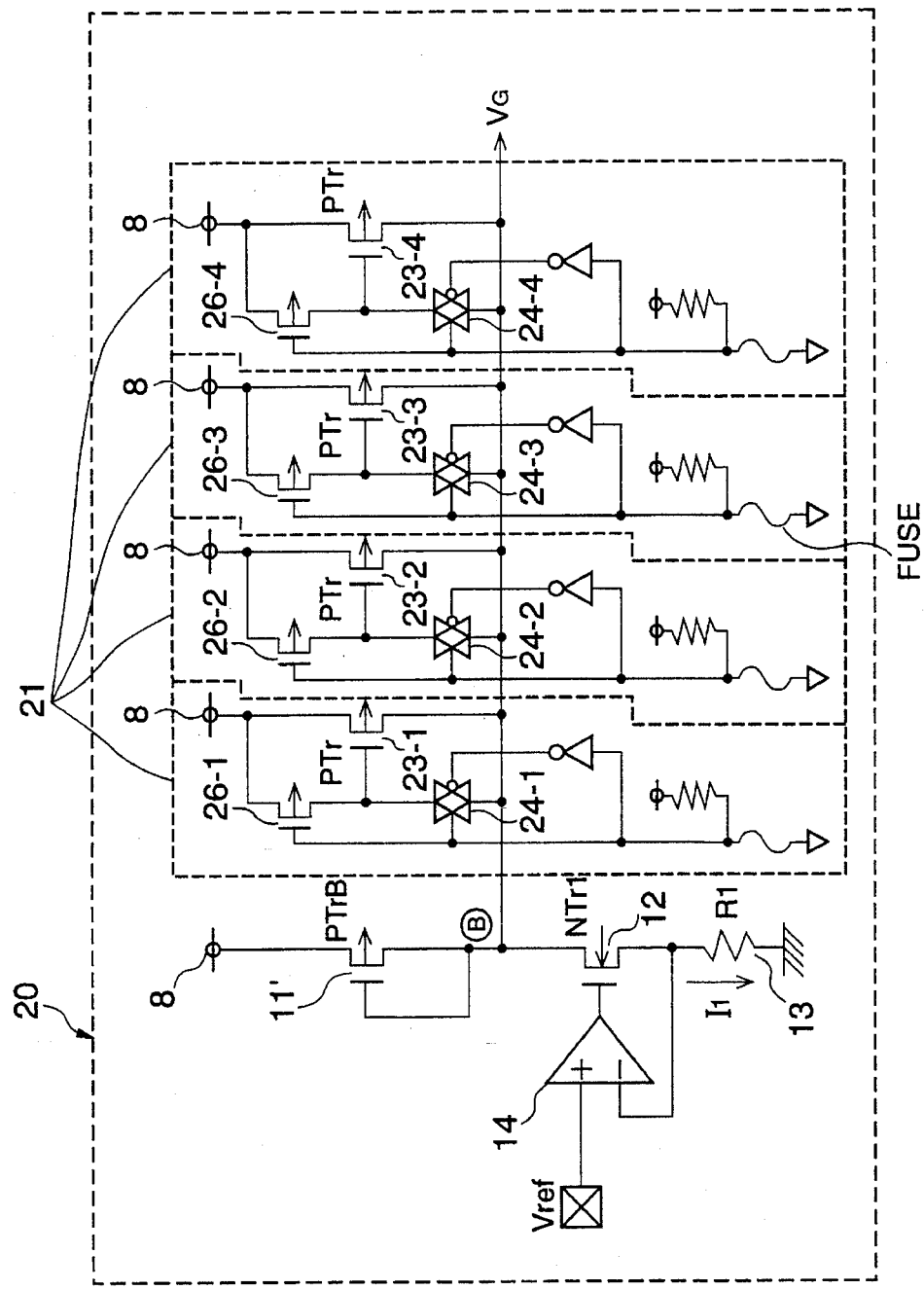
FIG. 6 is a circuit diagram of a variation of the embodiment of an intensity controlling circuit device shown in FIG. 2.

FIG. 6 shows a variation of the above-mentioned embodiment. In this variation, a fuse is provided instead of each of the control signal input terminals 25. Each fuse may be blown off when the corresponding PMOS transistors 23-1 to 23-4 are turned on so as to increase the intensity of the light beams emitted by the LED-array chips 41.

Figure 7:
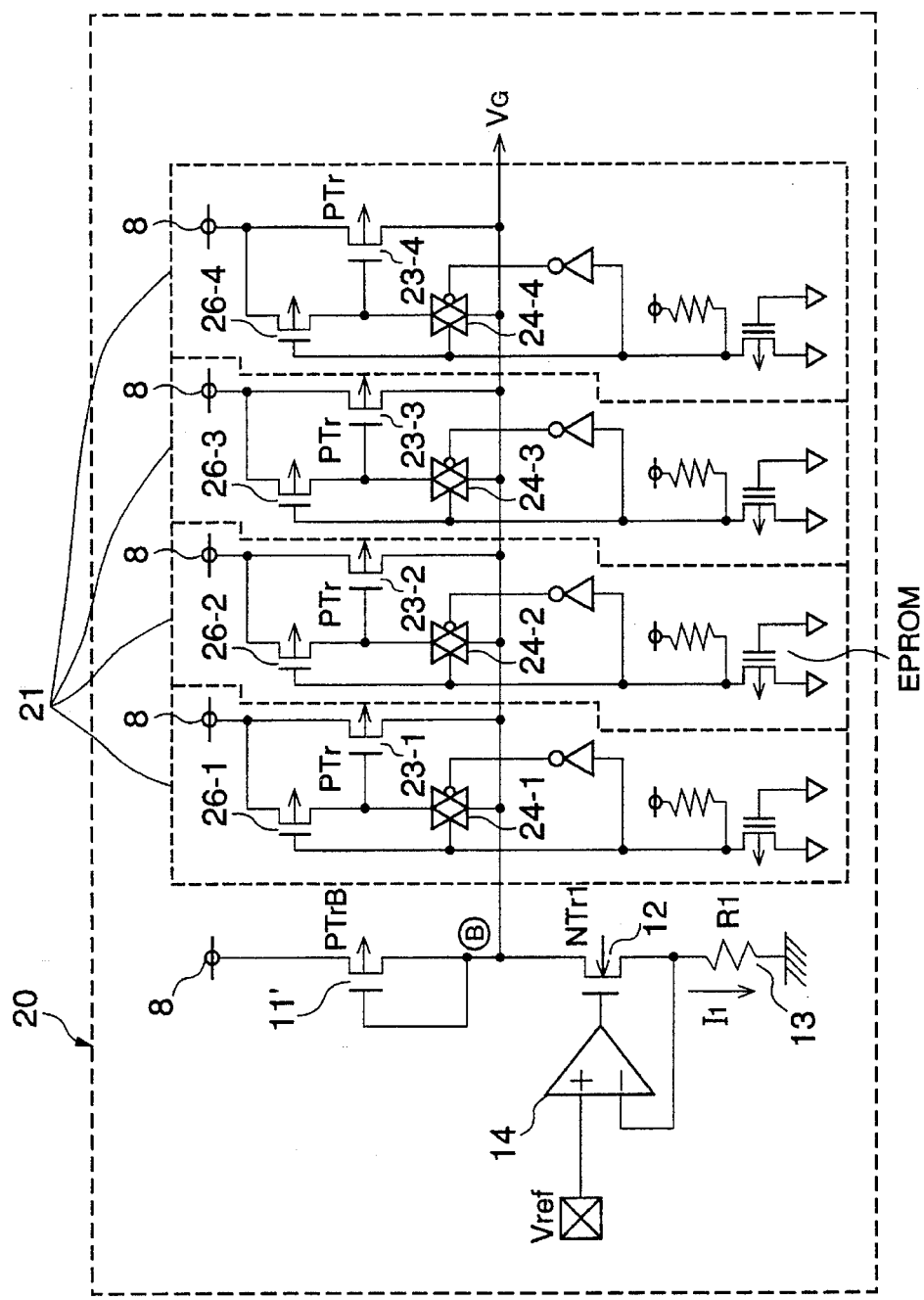
FIG. 7 is a circuit diagram of another variation of the embodiment of an intensity controlling circuit device shown in FIG. 2.

FIG. 7 shows another variation of the above-mentioned embodiment. In this variation, an EPROM is provided instead of each of the control signal input terminals 25. The EPROM stores the control signal according to the predetermined level of the intensity of the light beams emitted by the LED-array chips 41, and supplies the stored control signal so as to control the on/off state of the corresponding PMOS transistors 23-1 to 23-4 similarly to the above-mentioned embodiment.

The present invention is not limited to the specifically disclosed embodiments, and variations and modifications may be made without departing from the scope of the present invention.

What is claimed is:

1. In an intensity controlling circuit device used for an LED-array head having at least one light-emitting means having a plurality of LEDs and corresponding slave transistors, an intensity controlling circuit connected to the respective light-emitting means so as to control intensity of light beams emitted by the LEDs, said intensity controlling circuit comprising:

a) a first transistor;
   b) a constant current generating means for generating a constant current flowing in said first transistor so as to generate a voltage which controls a current output from said slave transistors; and
   c) intensity adjusting means having:
      1) an output connected to each of said slave transistors in the light-emitting means;
      2) a second transistor connected in parallel to said first transistor, between a power source and said constant current generating means; and
      3) controlling means for controlling the on/off state of said second transistor by turning said second transistor on/off so that a current flowing in each of said LEDs is adjusted to a predetermined value;

wherein a fuse is connected to said controlling means so that a control signal used for turning on/off said second transistor is supplied to said controlling means via said fuse, said fuse being blown when said second transistor is to be maintained in the on state so as to decrease a current flowing in each of the LEDs in a single light-emitting means.

2. In an intensity controlling circuit device used for an LED-array head having at least one light-emitting means having a plurality of LEDs and corresponding slave transistors, an intensity controlling circuit connected to the respective light-emitting means so as to control intensity of light beams emitted by the LEDs, said intensity controlling circuit comprising:

a) a first transistor;
   b) a constant current generating means for generating a constant current flowing in said first transistor so as to generate a voltage which controls a current output from said slave transistors; and
   c) intensity adjusting means having:
      1) an output connected to each of said slave transistors in the light-emitting means;
      2) a second transistor connected in parallel to said first transistor, between a power source and said constant current generating means; and
      3) controlling means for controlling the on/off state of said second transistor by turning said second transistor on/off so that a current flowing in each of said LEDs is adjusted to a predetermined value;

wherein an EPROM is connected to said controlling means so that a control signal, stored in said EPROM, used for turning on/off said second transistor, is supplied to said controlling means from said EPROM.

* * * * *

UNITED STATES PATENT AND TRADEMARK OFFICE
CERTIFICATE OF CORRECTION

PATENT NO. : 5,517,151
DATED : May 14, 1996
INVENTOR(S) : Shinichi KUBOTA

It is certified that error appears in the above-indentified patent and that said Letters Patent is hereby corrected as shown below:

On the Title page, insert the following item:

--[30] FOREIGN APPLICATION PRIORITY DATA
May 26, 1993 [JP]................5-123901--

Signed and Sealed this

First Day of October, 1996

Attest:

BRUCE LEHMAN

Attesting Officer

Commissioner of Patents and Trademarks